United States Patent
Wu et al.

(10) Patent No.: US 10,626,725 B2
(45) Date of Patent: Apr. 21, 2020

(54) GAS PASSAGE SWITCHING STRUCTURE FOR PNEUMATIC ROTARY HAND TOOL

(71) Applicant: De Poan Pneumatic Corp., Taipei Hsien (TW)

(72) Inventors: I-Tsung Wu, Taipei Hsien (TW); Yi-Wei Wen, Taipei Hsien (TW); Shun-Yao Yang, Taipei Hsien (TW)

(73) Assignee: DE POAN PNEUMATIC CORP., Taipei Hsien (TW)

( * ) Notice: Subject to any disclaimer, the term of this patent is extended or adjusted under 35 U.S.C. 154(b) by 267 days.

(21) Appl. No.: 15/821,933

(22) Filed: Nov. 24, 2017

(65) Prior Publication Data

US 2019/0003306 A1 Jan. 3, 2019

(30) Foreign Application Priority Data

Jun. 29, 2017 (TW) .............................. 106121773 A

(51) Int. Cl.

| F01C 1/344 | (2006.01) |
|---|---|
| B25F 5/02 | (2006.01) |
| F01C 21/00 | (2006.01) |
| F16K 11/085 | (2006.01) |
| B25B 21/00 | (2006.01) |
| F01C 13/02 | (2006.01) |
| F01C 20/04 | (2006.01) |

(Continued)

(52) U.S. Cl.
CPC ............ *F01C 1/3442* (2013.01); *B25B 21/00* (2013.01); *B25F 5/02* (2013.01); *F01C 13/02* (2013.01); *F01C 20/04* (2013.01); *F01C 21/00* (2013.01); *F01C 21/18* (2013.01); *F16K 3/24* (2013.01); *F16K 11/074* (2013.01); *F16K 11/0853* (2013.01); *B25B 21/02* (2013.01); *F01C 2021/1675* (2013.01)

(58) Field of Classification Search
CPC .......... F01C 1/3442; F01C 21/00; B25F 5/02; F16K 11/0853
USPC .................................... 173/218, 168; 91/508
See application file for complete search history.

(56) References Cited

U.S. PATENT DOCUMENTS

| 4,776,408 A | * | 10/1988 | Elkin | ..................... B25D 17/24 |
|---|---|---|---|---|
| | | | | 173/162.1 |
| 4,844,177 A | * | 7/1989 | Robinson | ................ B25B 21/00 |
| | | | | 173/178 |

(Continued)

FOREIGN PATENT DOCUMENTS

| TW | I453077 B | 9/2014 |
|---|---|---|
| TW | I481484 B | 4/2015 |

*Primary Examiner* — Nathaniel E Wiehe
*Assistant Examiner* — Richard C Drake
(74) *Attorney, Agent, or Firm* — Chun-Ming Shih

(57) ABSTRACT

A gas passage switching structure for a pneumatic rotary hand tool includes a pneumatic motor and a revolving valve disposed in a device case. The pneumatic motor has an input ending surface. A forward gas inlet and a reverse gas inlet are formed and spaced apart on the input ending surface. The revolving valve has a gas supply surface. A gas supply port and a discharge port are formed and spaced apart on the gas supply surface. The gas supply surface and the input ending surface are arranged along an axis line in the device case adjacent or in contact with the arrangement so that it allows the pneumatic motor to drive the forward and reverse rotation by the high pressure air flow along the fluid passage in the axis line direction.

9 Claims, 5 Drawing Sheets

(51) Int. Cl.
*F01C 21/18* (2006.01)
*F16K 3/24* (2006.01)
*F16K 11/074* (2006.01)
*B25B 21/02* (2006.01)

(56) References Cited

U.S. PATENT DOCUMENTS

| | | | | |
|---|---|---|---|---|
| 5,142,952 A | * | 9/1992 | Putney | B25B 13/465 81/57 |
| 5,383,771 A | * | 1/1995 | Ghode | F01C 13/02 415/904 |
| 6,082,986 A | * | 7/2000 | Seward | F01C 20/04 418/268 |
| 6,241,500 B1 | * | 6/2001 | Ellis | B25B 21/02 418/1 |
| 6,298,753 B1 | * | 10/2001 | Izumisawa | B25B 21/004 81/57.39 |
| 6,435,060 B1 | * | 8/2002 | Izumisawa | B25B 21/004 81/57.26 |
| 7,886,840 B2 | * | 2/2011 | Young | F01D 15/06 173/168 |
| 9,296,094 B2 | * | 3/2016 | Su | B25B 21/00 |
| 2008/0173460 A1 | * | 7/2008 | Sun | B25F 5/02 173/219 |
| 2008/0298960 A1 | * | 12/2008 | Mueller | A61C 1/05 415/208.1 |
| 2011/0247220 A1 | * | 10/2011 | Whited | B26B 25/002 30/276 |
| 2014/0060872 A1 | * | 3/2014 | Ting | B25F 5/02 173/218 |
| 2014/0238711 A1 | * | 8/2014 | Myhill | B25F 5/001 173/1 |
| 2015/0147212 A1 | * | 5/2015 | Nelson | F01C 1/3442 418/15 |
| 2015/0273679 A1 | | 10/2015 | Su et al. | |
| 2019/0160644 A1 | * | 5/2019 | Wu | B25F 5/001 |

* cited by examiner

GAS PASSAGE SWITCHING STRUCTURE FOR PNEUMATIC ROTARY HAND TOOL

FIELD OF THE INVENTION

The present invention relates to pneumatic hand tools for rotating objects to lock tightly and for rotating the objects to loose, and more particularly to a gas passage switching structure for a pneumatic rotary hand tool.

PRIOR ARTS OF THE INVENTION

A pneumatic rotary hand tool, in general, is provided to an operator with a screwdriver and a nut or a bolt to be locked or loosen. The pneumatic rotary hand tool is typically equipped with an air motor for receiving a high rotational air drive to produce a rotational kinetic energy output. In the process of output rotation kinetic energy, generally it is implemented with the output of the percussion kinetic energy, in order to lock the nut or bolt when the kinetic energy can be used to increase the tight fit between the screw, and in the removal of nuts or bolt it can be used by the impact of the kinetic energy to speed up the intermittent loosening of the thread.

It is known that for the pneumatic rotary hand tools in order to screw and loosen the nuts or bolts, the output of the crucified with the kinetic energy must have the ability to forwardly or reversely rotate, has the ability to rely on the assembly of the body of the high-pressure air, must be able to drive the air motor to produce forward and reverse rotation. Thus the tool body must have to facilitate the operator to switch the high pressure air switch and reverse the air path.

For example, U.S. Pat. No. 7,886,840, TW 1453077, U.S. Patent application 2015/0273679 (TWM484470), TW 1481484 and the like disclose the pneumatic rotary hand tool. U.S. Pat. No. 7,886,840 and TW 1453077 disclose the installation of an air motor in a tool body handle for providing same axial orientation of high pressure air in the chamber (TWM484470). TW 1481484 patent teaches the use of a pneumatic motor at the turning point at one end of the tool body handle so that axial transmission of the air motor is not in the same direction as the pressure chamber of the pneumatic motor.

Although these patents teach the air motor can be placed in different axial position, but they expose somethings in common, that is, the body of the air motor are equipped with lateral intake and lateral exhaust. In other words, the positive and reverse air intake and positive and reverse vent openings on the air motor are radially open to the axis of the air motor. This design will allow high pressure air in the tool body (which is the radial position of the axial line of the air motor) extending from the inlet end of the tail of the tool body grip to the side of the air motor, It is possible to carry out the output switching of the forward and the reverse kinetic energy, and even the problem that the gas path structure of the tool body is too complicated and is not conducive to the miniaturization of the tool body and the reduction of the flow resistance of the high pressure air in the gas path is in urgent need to be improved.

SUMMARY OF THE INVENTION

The object of the present invention is to provide an axial transmission using a pneumatic motor to be used as a gas inlet surface and a gas discharge surface of forward and reverse rotation by a high pressure air driven pneumatic motor, thereby solving the problem saying the internal gas structure of the traditional pneumatic rotary hand tool is too complex.

According to a preferred embodiment of the present invention, there is provided a gas passage switching structure for a pneumatic rotary hand tool comprising:

a device case which forms a hollow shell-like column along an axis line and serves as a handle for the hand tool, the device case having a gas chamber capable of accumulating high pressure air, and a gas vent fluidly connected to the atmosphere being formed at one side of walls of the device case;

a pneumatic motor disposed along the axis line in the device case, an output ending surface and an input ending surface being respectively formed at both sides of the axis line of the pneumatic motor, the pneumatic motor having an output shaft extending over the output ending surface along the axis line, the pneumatic motor having a forward gas inlet and a reverse gas inlet which are respectively formed and spaced away on the input ending surface in the direction of the axis line; and a revolving valve which is in the form of a hollow shaft and is pivotable in the device case so that the revolving valve is located between the input ending surface of the pneumatic motor and the gas chamber of the device case along the axis line, a gas guiding passage being formed in the revolving valve along the axis line, for the revolving valve a gas supply surface and a gas inlet surface being respectively formed at both sides of the axis line, the gas supply surface being adjacent to the input ending surface, and the gas guiding passage being fluidly connected to the gas chamber via the gas inlet surface;

wherein a gas supply port for fluidly connecting to the gas guiding passage and a discharge port for fluidly connecting to the exhaust flow division hole of the device case are formed and spaced away on the gas supply surface, an user can switch and rotate the revolving valve between an output forward position and an output reverse position, when the revolving valve is switched and rotated to the output forward position, the gas supply port is fluidly connected to the forward gas inlet and the discharge port is fluidly connected to the reverse gas inlet, when the revolving valve is switched and rotated to the output reverse position, the gas supply port is fluidly connected to the reverse gas inlet and the discharge port is fluidly connected to the forward gas inlet.

In the further implementation of the present invention, preferably the forward gas inlet and the reverse gas inlet are respectively located at an eccentric position through which the input ending surface extends relative to the axis line, and the gas supply port and the discharge port are respectively located at an eccentric position through which the gas supply surface extends relative to the axis line.

In the further implementation of the present invention, an elastic component is preferably arranged between the revolving valve and the gas chamber.

In the further implementation of the present invention, preferably the device case is further provided with a flow guiding disk which is disc-shaped and has two corresponding plate surfaces so that the two corresponding plate surfaces of the flow guiding disk are respectively located between the inlet ending surface of the pneumatic motor and the gas supply surface of the revolving valve, the inlet ending surface of the pneumatic motor and the gas supply surface of the revolving valve are fluidly connected with each other through the flow guiding disk, on the flow guiding disk a forward gas closure hole and a reverse gas closure hole for fluidly connecting are respectively formed, when the revolving valve is switched and rotated to the output forward position, the gas supply port is fluidly connected to the forward gas inlet via the forward gas closure hole and the discharge port is fluidly connected to the reverse gas inlet via the reverse gas closure hole, when the revolving valve is switched and rotated to the output reverse position, the gas supply port is fluidly connected to the reverse gas inlet via the reverse gas closure hole and the discharge port is fluidly connected to the forward gas inlet via the forward gas closure hole.

In the implementation of the flow guiding disk provided in the device case in the present invention, the flow guiding disk is preferably integrated with the input ending surface of the pneumatic motor.

In the further implementation of the present invention, preferably the forward gas inlet and the reverse gas inlet are respectively located at an eccentric position through which the input ending surface extends relative to the axis line, the forward gas closure hole and the reverse gas closure hole are respectively located at an eccentric position through which the flow guiding disk extends relative to the axis line, and the gas supply port and the discharge port are respectively located at an eccentric position through which the gas supply surface extends relative to the axis line.

In the further implementation of the present invention, preferably the cross-sectional apertures of the forward gas closure hole and the reverse gas closure hole are respectively a fan having an arc angle θ1, the gas supply port and the discharge port are respectively a fan having an arc angle θ2, and 0<θ1<θ2≤π.

In the further implementation of the present invention, preferably the forward gas inlet and the reverse gas inlet are respectively formed in a long arc shape along the circumferential path of the pneumatic motor, the area of the forward gas inlet is larger than the area of the cross-sectional apertures of the forward gas closure hole, and the area of the reverse gas inlet is larger than the area of the cross-sectional apertures of the reverse gas closure hole.

In the further implementation of the present invention, preferably a separating wall is formed on the flow guiding disk, the separating wall separates the forward gas closure hole from the reverse gas closure hole to space apart and to form a forward gas cavity and a reverse gas cavity at one side of the flow guiding disk, the forward gas inlet is fluidly connected to the forward gas closure hole via the forward gas cavity and the reverse gas inlet is fluidly connected to the reverse gas closure hole via the reverse gas cavity.

In the further implementation of the present invention, preferably an elastic component is disposed between the revolving valve and the air chamber, and the revolving valve is pressed by the elastic component so that one side of the corresponding plate surface is pressed to contact the flow guiding disk.

In the further implementation of the present invention, preferably a blocking portion adjacent to the gas chamber is formed in the device case, and the elastic component is disposed between the blocking portion and the gas inlet surface of the revolving valve.

According to the above descriptions, the technical effects exhibited by the present invention are that the locations of the forward gas inlet and the reverse gas inlet of the pneumatic motor is disposed along the axis line of the device case for facilitating arrangement of the revolving valve which can be regulated to be forwardly rotated or reversely rotated to be placed between the gas inlet surface of the pneumatic motor and the gas chamber of the device case along the axis line, thereby simplifying the gas passage structure in which the high pressure air in the tool body drives the pneumatic motor to forwardly rotate or reversely rotate, reducing air flow resistance of the high pressure air flowing in the gas passage and contributing to the small body design of the tool body.

DETAILED DESCRIPTION OF THE INVENTION

Please refer to FIGS. 1 to 5 disclosing the details of the configuration of a preferred embodiment of the present invention and demonstrating the gas passage switching structure for a pneumatic rotary hand tool according to the present invention comprising a pneumatic motor 20 and a revolving valve 30 in the device case 10.

Figure 1:
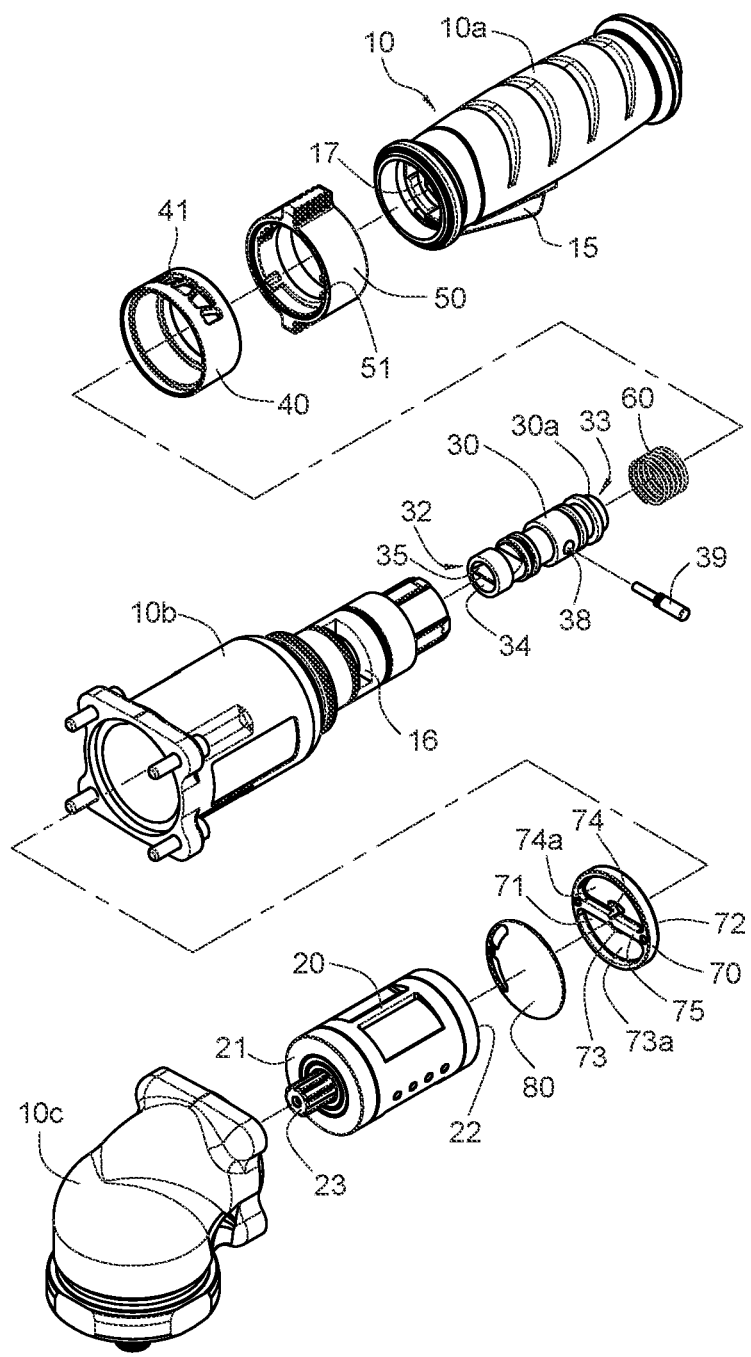
FIG. 1 is an exploded perspective view of a preferred embodiment of the gas passage switching structure for a pneumatic rotary hand tool of the present invention.
Figure 2:
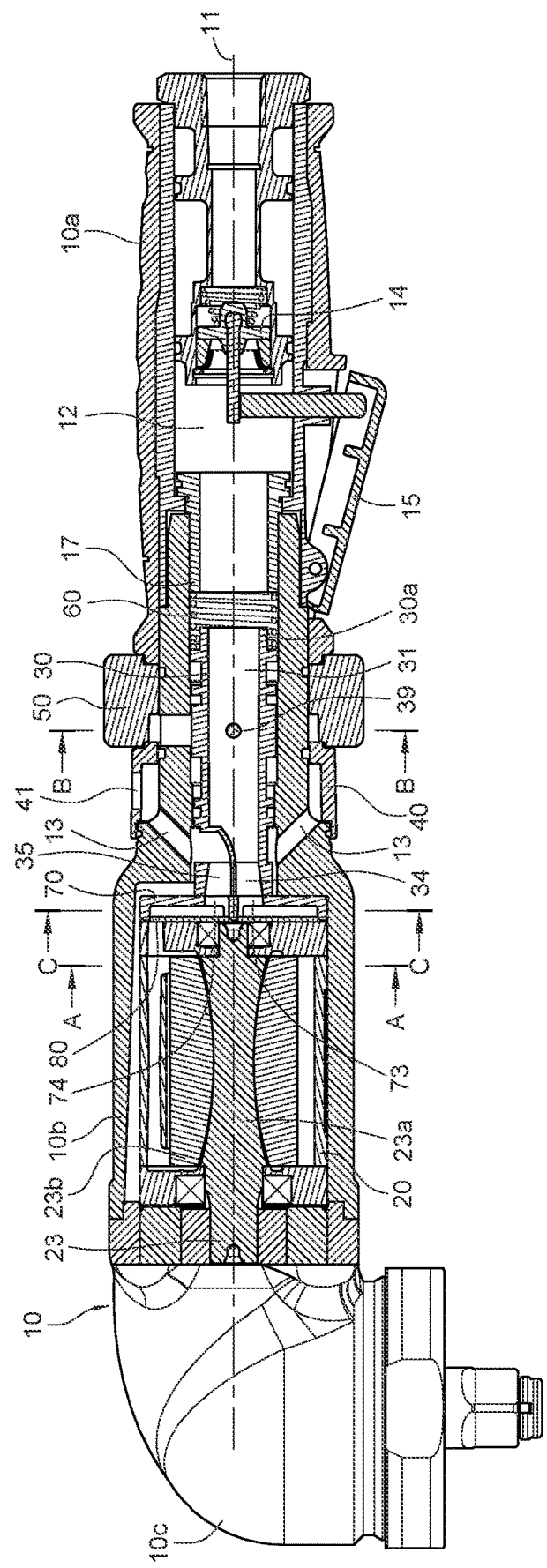
FIG. 2 is a cross-sectional view of FIG. 1 of the present invention.

As shown in FIGS. 1 and 2, the device case 10 forms a hollow shell-like column along an axis line and serves as a handle for the hand tool. In essence, in order to take into account the convenience of assembling the pneumatic motor 20 and the revolving valve 30, the device case 10 may be assembled in series by fixing a handle housing 10a, a motor housing 10b and a head housing 10c along the axis line 11 so that a gas chamber 12 for assembling high pressure air can be formed in the handle housing 10a of the device case 10 and the end of the handle housing 10a of is used as a lock port for fluidly connecting the high pressure air connector.

One end of the gas chamber 12 is provided with a gas valve 14 and a side wall surface of the handle housing 10a is provided with push-button switch 15 for pressing and releasing by hand of the operator. The push-button switch 15 is pressed to turn on the gas valve 14 so that the high pressure air can be introduced into the gas chamber 12 from the lock port at the end of the handle housing 10a. The push-button switch 15 is released to block the high pressure air from introducing into the gas chamber 12 from the lock port at the end of the handle housing 10a.

The motor housing 10b is provided with a fitting hole in a ladder-like shape so that the pneumatic motor 20 and the revolving valve 30 can be fitted in the fitting hole of the motor housing 10b in series along the axis line 11. A gas vent 13 for fluidly connecting to the atmosphere is formed on one side of the motor housing 10b of the device case 10. In implementation of the present invention, on the outer wall of the gas vent 13 formed by the device case 10 an exhaust ring 40 is provided and mounted. The exhaust ring 40 is provided with a plurality of exhaust flow division holes 41 for fluidly connecting to the atmosphere so that the plurality of the exhaust flow division holes 41 can be fluidly connected to gas vent 13 to guide the remaining high pressure air discharged after the rotation of the pneumatic motor 20. The exhaust ring 40 can be used to buffer the exhaust gas discharged from the gas vent 13 to prevent the residual gas from directly impacting the operator's hand and causing discomfort.

Further, the pneumatic motor 20 is fixed to the motor housing 10b of the device case 10 along the axis line 11, and an output ending surface 21 and an input ending surface 22 are respectively formed at both ends of the pneumatic motor 20. It is understood from the general knowledge that a rotor 23a is pivotally mounted in the pneumatic motor 20. The rotor 23a is removable and arranged with a plurality of blades 23 which are driven and rotated by the flowing of high pressure air via the blades. The rotor 28a is formed with an output shaft 23 which extends from the output ending surface 21 along the axis line 11 and extends into the helical gear and the percussion power set of the head housing 10c. (is not main point of the present invention and will not be described in details)

Figure 3:
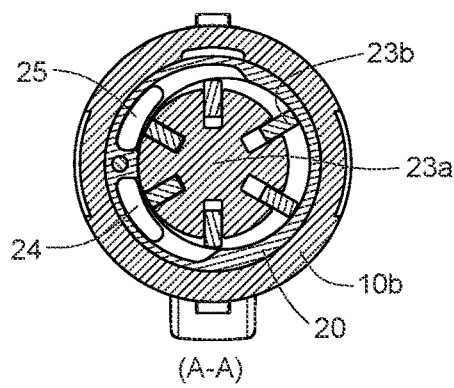
FIG. 3 is a cross-sectional view taken along the line A-A in FIG. 2 of the present invention.

In addition, as shown in FIGS. 1, 2 and 3, the pneumatic motor 20 has a forward gas inlet 24 and a reverse gas inlet 25 which are respectively spaced apart and formed on the input ending surface 22 in the direction of the axis line 11. The forward gas inlet 24 and the reverse gas inlet 25 may be provided at an eccentric position relative to the axis line 11 extending and passing through by the input ending surface 22. The forming location of the forward gas inlet 24 and the reverse gas inlet 25 is one of the important factors of simplifying the gas passage structure of high pressure air in the tool body in the present invention.

As shown in FIGS. 1 and 2, the revolving valve 30 is in the form of a hollow shaft and is capable of being swung and pivoted in the device case 10 so that the revolving valve 30 can be disposed between the input ending surface 22 of the pneumatic motor 20 and the gas chamber 12 of the device case 10. In implementation, at a radial hole at one side of the revolving valve 30 a bolt hole 38 is disposed. The bolt hole 38 can hold a bolt bar 39 extending in the radial direction of the revolving valve 30.

Figure 4:
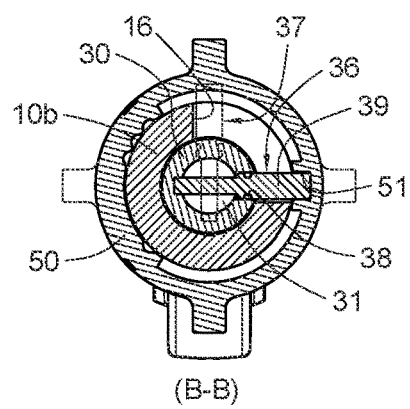
FIG. 4 is a cross-sectional view taken along the line B-B in FIG. 2 of the present invention.

In addition, as shown in FIG. 4, a stroke arc hole 16 is disposed on a seat wall of the motor housing 10b. At the outer circumference of the seat wall of the stroke arc hole 16 disposed at the motor housing 10b a rotating ring 50 is disposed. A slot 51 is formed on an inner wall of the rotating ring 50. The bolt bar 39 can protrude into the stroke arc hole 16 and causes the bolt bar 39 to be engaged with the slot 51 of the rotating ring 50 so as to enable the operator to rotate the rotating ring 50 by hand to drive the bolt bar 39 to make the revolving valve 30 rotate forwardly or reversely. The stroke arc hole 16 is capable of restraining rotation angle of the bolt bar 39 and controlling the revolving valve 30 to be rotated and driven into an output forward position 36 or an output reverse position 37.

As shown in FIG. 2, a gas guiding passage 31 is formed in the revolving valve 30 along the axis line 11. A gas supply surface 32 and a gas inlet surface 33 are respectively formed at both ends of the axis line 11 passing through the revolving valve 30. The gas guiding passage 31 extends through the gas inlet surface 33 so that the gas guiding passage 31 can be fluidly connected to the gas chamber 12 via the gas inlet surface 33. The gas supply surface 32 of the revolving valve 30 is adjacent to the input ending surface 22 of the pneumatic motor 20. When the other member is not provided between the revolving valve 30 and the pneumatic motor 20 (for example, the flow guiding disk 70 described later), the gas supply surface 32 is in close contact with the input ending surface 22 of the pneumatic motor 20.

A gas supply port 34 for fluidly connecting to the gas guiding passage 31 and a discharge port 35 for fluidly connecting to the gas vent 13 of the device case 10 are spaced apart and formed. As shown in FIGS. 1 and 2, the gas supply port 34 and the discharge port 35 of the revolving valve 30 are respectively disposed at an eccentric location through which the gas supply surface 32 passes through the axis line 11. For the discharge port 35 the eccentric location in the direction of the axis line 11 extends in the radial direction of the axis line 11 in the form of an arc groove so as to be fluidly connected to the gas vent 13 of the device case 10.

In addition, an elastic component 60 is disposed between the revolving valve 30 and the gas chamber 12. More specifically, a blocking portion 17 adjacent to the gas chamber 12 is formed in the device case 10. On the outer wall of the gas inlet surface 33 of the revolving valve 30 a rib 301 is formed. The elastic component 60 is disposed between the blocking portion 17 and the rib 30a so as to apply a urging force to the revolving valve 30 so that the gas supply surface 32 of the revolving valve 30 moves close in the direction of the input ending surface 22 of the pneumatic motor 20 to the extent of reaching the touch contact.

Figure 5:
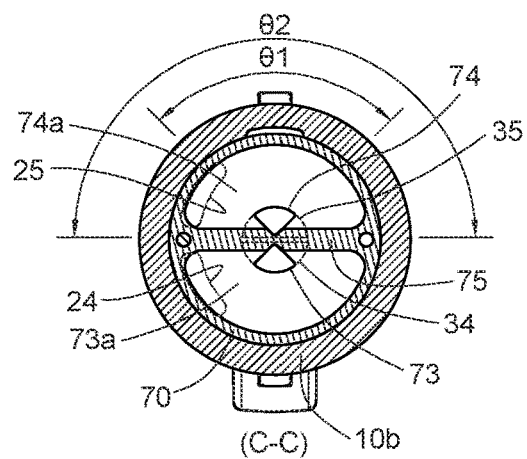
FIG. 5 is a cross-sectional view taken along the line C-C in FIG. 2 of the present invention.
Figure 6A:
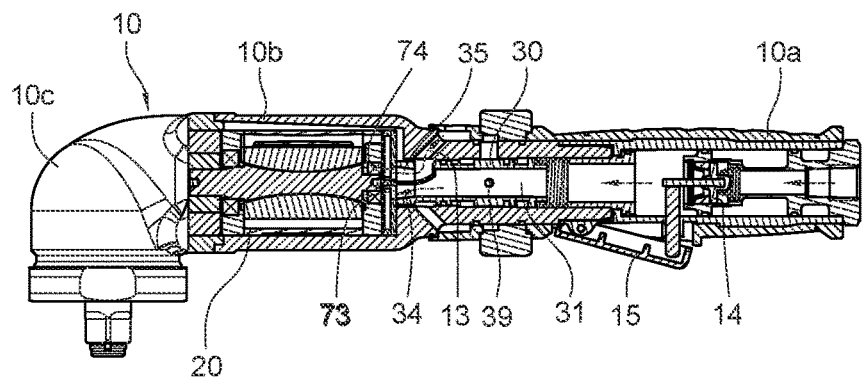
FIGS. 6a to 6c respectively disclose the gas passage schematic of the high pressure air driven by the pneumatic motor during forward rotation.
Figure 6B:
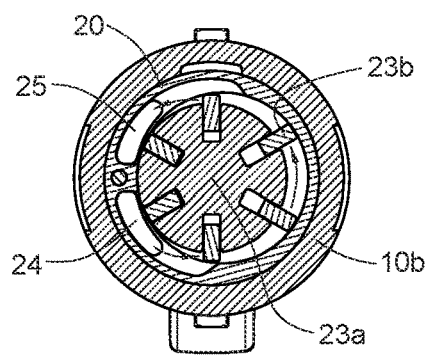
Figure 6C:
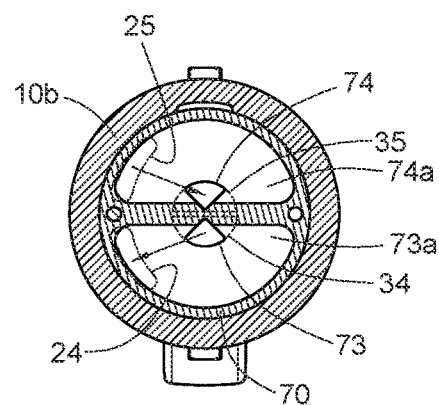
Figure 7A:
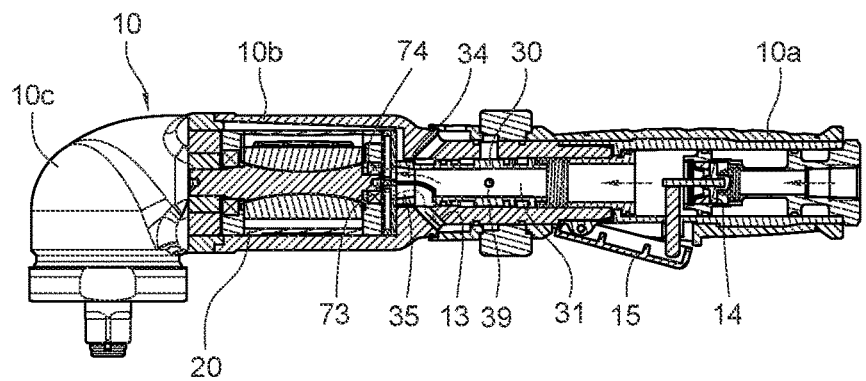
FIGS. 7a to 7c respectively show the gas passage schematic of the high pressure air driven by the pneumatic motor reverse rotation.
Figure 7B:
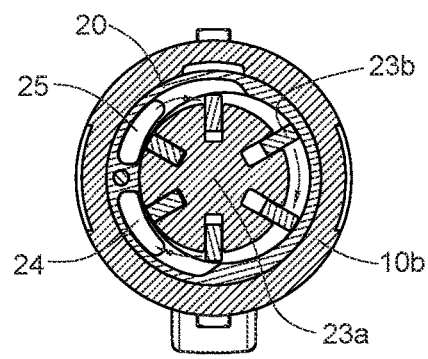
Figure 7C:
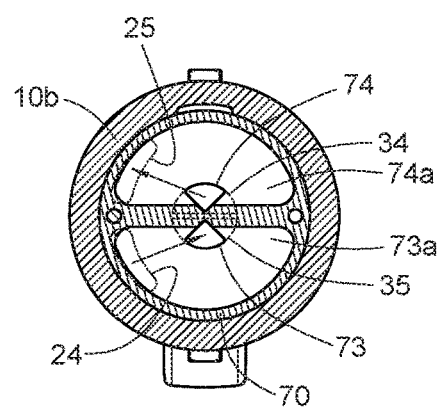

Please refer to FIGS. 1, 2, and 5 disclosing a flow guiding disk 70 is disposed in the motor 10b of the device case 10 and is combined on the input ending surface 22 of the pneumatic motor 20. The flow guiding disk 70 is disc-shaped and has a first corresponding plate surface 71 and a second corresponding plate surface 72 so that the first corresponding plate surface 71 and the second corresponding plate surface 72 of the flow guiding disk 70 are located between the input ending surface 22 of the pneumatic motor 20 and the gas supply surface 32 of the revolving valve 30. A forward gas closure hole 73 and a reverse gas closure hole 74 for respectively fluidly connecting the first corresponding plate surface 71 and the second corresponding plate surface 72 are formed on the flow guiding disk 70. The forward gas closure hole 73 and the reverse gas closure hole 74 are located in an eccentric location through which the flow guiding disk 70 passes through the axis line 11. A sealing pad 80 is disposed between the flow guiding disk 70 and the input ending surface 22 of the pneumatic motor 20. The sealing pad 80 is used for increasing the airtightness when the flow guiding disk 70 is combined with the input ending surface 22 of the pneumatic motor 20.

Further, as shown in FIG. 5 disclosing the cross-sectional apertures of the forward gas closure hole 73 and the reverse gas closure hole 74 are respectively shown to be a fan shape having an arc angle $\theta 1$ while the gas supply port 34 and the discharge port 35 are shown to be a fan shape having an arc angle $\theta 2$. The relationship between the arc angles $\theta 1$ and $\theta 2$ is $0 < \theta 1 < \theta 2 \leq \pi$. In the present embodiment, the forward gas inlet 24 and the reverse gas inlet 25 are formed in a long arc shape along the circumferential path of the pneumatic motor 20. The area of the forward gas inlet 24 is larger than the cross-sectional aperture of the forward gas closure hole 73. The area of the reverse gas inlet 25 is larger than the cross-sectional aperture of the reverse gas closure hole 74, but is not limited thereto.

As shown in FIGS. 1 and 2, a separating wall 75 is formed on the flow guiding disk 70. The separating wall 75 is capable of separating the forward gas closure hole 73 from the reverse gas closure hole 74. The separating wall 75 is capable of spacing and forming a forward gas cavity 73a and a reverse gas cavity 74a on one side of the flow guiding disk 70. The forward gas cavity 73a serves as a connecting interface for connecting the forward gas inlet 24 and the forward gas closure hole 73 and the reverse gas cavity 74a serves as a connecting interface for connecting the reverse gas inlet 25 and the reverse gas closure hole 74 so that the forward gas inlet 24 is fluidly connected to the forward gas closure hole 73 via the forward gas cavity 73a and the reverse gas inlet 25 is fluidly connected to the reverse gas closure hole 74 via the reverse gas cavity 74a.

The arrangement of the flow guiding disk 70 is intended so that the input ending surface 22 of the pneumatic motor 20 can be connected to the gas supply surface 32 of the revolving valve 30 which is different in size from the outside diameter so that the high pressure air passes from the revolving valve 30 and through the flow guiding disk 70, and then enter the pneumatic motor 20. In addition, the forward gas closure hole 73 on the flow guiding disk 70 can be formed so as to form a throttle port in a form relatively smaller than the area of the gas supply port 34 and the area of the forward gas inlet 24. In this way, the reverse gas closure hole 74 on the flow guiding disk 70 can form a throttle port in a form relatively smaller than the area of the discharge port 35 and the reverse gas inlet 25 to facilitate the use of the throttle port to control the flowing rate of the gas passage driven by the pneumatic motor 20 in forward rotation or in reverse rotation. Thus, the torque values of the forward output and the reverse output are regulated. However, in the present invention, the flow guiding disk 70 is merely an additional member, and is not an essential component that is indispensable to solve the problem.

Please refer to FIGS. 4 and 6a to 6c demonstrating that when the revolving valve 30 is rotated to the output forward position 36, the gas supply port 34 of the revolving valve 30 can be fluidly connected to the forward gas inlet 24 of the pneumatic motor 20 via the forward gas closure hole 73. The discharge port 35 of the revolving valve 30 can be fluidly connected to the reverse gas inlet 25 fluidly connecting the pneumatic motor 20 via the reverse gas closure hole 74 so that the high pressure air in the gas guiding passage 31 of the revolving valve 30 can be used to output forward rotation energy after the high pressure air flows through the gas supply port 34, the forward gas closure hole 73 and the forward gas inlet 24 to drive the output shaft 23 of the pneumatic motor 20. When the pneumatic motor 20 is rotated forwardly, the remaining gas of the generated high pressure air flows through the reverse gas inlet 25, the reverse gas closure hole 74, the discharge port 35 of the revolving valve 20, the exhaust flow division hole 41 of the exhaust ring 40 sequentially and discharged to the outside atmosphere.

Please refer to FIGS. 4 and 7a to 7c disclosing when the revolving valve 30 is rotated to the output reverse position 37, the gas supply port 34 of the revolving valve 30 can be fluidly connected to the reverse gas inlet 25 of the pneumatic motor 20 via the reverse gas closure hole 74. The discharge port 35 of the revolving valve 30 can be fluidly connected to the forward gas inlet 24 fluidly connecting the pneumatic motor 20 via the forward gas closure hole 73 so that the high pressure air in the gas guiding passage 31 of the revolving valve 30 can be used to output reverse rotation energy after the high pressure air flows through the gas supply port 34, the reverse gas closure hole 74 and the reverse gas inlet 25 are used to drive the output shaft 23 of the pneumatic motor 20. When the pneumatic motor 20 is rotated reversely, the remaining gas of the generated high pressure air flows through the forward gas inlet 24, the forward gas closure hole 73, the discharge port 35 of the revolving valve 20, the exhaust flow division hole 41 of the exhaust ring 40 sequentially and discharged to the outside atmosphere.

In the example in which the flow guiding disk 70 is disposed, the elastic component 60 disposed between the revolving valve 30 and the gas chamber 12 is capable of pushing the revolving valve 30 and bringing the gas supply surface 32 into contact with the disk surface of the flow guiding disk 70.

It is worth mentioning that the output ending surface 21, the input ending surface 22, the gas supply surface 32, the gas inlet surface 33 and the axis line 11 mentioned above are perpendicular to each other as described above. In the preferred embodiment, the axis line 11 is projected through the center of the end face.

According to the above-described configuration, the pneumatic motor driven to forwardly rotate or reversely rotate by the high pressure air in the device case is provided in the direction of the axial center of the device case so as to extend the gas path to the diameter of the air motor. In this way, the present invention not only can simplify the body structure of the tool body driven by high pressure air to drive pneumatic motor to rotate forwardly and reversely, and reduce the high pressure air flow resistance in the air passage, but also can effectively reduce the diameter width of the tool body shell, and then contribute to the miniaturization of the tool body.

The above embodiments are merely illustrative of preferred embodiments of the present invention, but are not to be construed as limiting the scope of the present invention. Accordingly, the present invention should be based upon the terms of the claims that are limited to the scope of the patent application.

We claim:

1. A gas passage switching structure for a pneumatic rotary hand tool comprising:
   a device case which forms a hollow shell-like column along an axis line and serves as a handle for the hand tool, the device case having a gas chamber capable of accumulating high pressure air, and a gas vent fluidly connected to the atmosphere being formed at least one side of walls of the device case;
   a pneumatic motor disposed along the axis line in the device case, an output ending surface and an input ending surface being respectively formed at both sides of the axis line of the pneumatic motor, the pneumatic motor having an output shaft extending over the output ending surface along the axis line, the pneumatic motor having a forward gas inlet and a reverse gas inlet which are respectively formed and spaced away on the input ending surface in the direction of the axis line; and
   a revolving valve which is in the form of a hollow shaft and is pivotable in the device case so that the revolving valve is located between the input ending surface of the pneumatic motor and the gas chamber of the device case along the axis line, a gas guiding passage being formed in the revolving valve along the axis line, for the revolving valve a gas supply surface and a gas inlet surface being respectively formed at both sides of the axis line, the gas supply surface being adjacent to the input ending surface, and the gas guiding passage being fluidly connected to the gas chamber via the gas inlet surface;
   wherein a gas supply port for fluidly connecting to the gas guiding passage and a discharge port for fluidly connecting to the exhaust flow division hole of the device case are formed and spaced away on the gas supply surface, an user can switch and rotate the revolving valve between an output forward position and an output reverse position, when the revolving valve is switched and rotated to the output forward position, the gas supply port is fluidly connected to the forward gas inlet and the discharge port is fluidly connected to the reverse gas inlet, when the revolving valve is switched and rotated to the output reverse position, the gas supply port is fluidly connected to the reverse gas inlet and the discharge port is fluidly connected to the forward gas inlet;

wherein an elastic component is arranged between the revolving valve and the gas chamber.

2. The gas passage switching structure for the pneumatic rotary hand tool as claimed in claim 1, wherein the forward gas inlet and the reverse gas inlet are respectively located at an eccentric position through which the input ending surface extends relative to the axis line, and the gas supply port and the discharge port are respectively located at an eccentric position through which the gas supply surface extends relative to the axis line.

3. The gas passage switching structure for the pneumatic rotary hand tool as claimed in claim 1, wherein the device case is further provided with a flow guiding disk which is disc-shaped and has two corresponding plate surfaces so that the two corresponding plate surfaces of the flow guiding disk are respectively located between the inlet ending surface of the pneumatic motor and the gas supply surface of the revolving valve, the inlet ending surface of the pneumatic motor and the gas supply surface of the revolving valve are fluidly connected with each other through the flow guiding disk, on the flow guiding disk a forward gas closure hole and a reverse gas closure hole for fluidly connecting are respectively formed, when the revolving valve is switched and rotated to the output forward position, the gas supply port is fluidly connected to the forward gas inlet via the forward gas closure hole and the discharge port is fluidly connected to the reverse gas inlet via the reverse gas closure hole, when the revolving valve is switched and rotated to the output reverse position, the gas supply port is fluidly connected to the reverse gas inlet via the reverse gas closure hole and the discharge port is fluidly connected to the forward gas inlet via the forward gas closure hole.

4. The gas passage switching structure for the pneumatic rotary hand tool as claimed in claim 3, wherein the flow guiding disk is integrated with the input ending surface of the pneumatic motor.

5. The gas passage switching structure for the pneumatic rotary hand tool as claimed in claim 3, wherein the forward gas inlet and the reverse gas inlet are respectively located at an eccentric position through which the input ending surface extends relative to the axis line, the forward gas closure hole and the reverse gas closure hole are respectively located at an eccentric position through which the flow guiding disk extends relative to the axis line, and the gas supply port and the discharge port are respectively located at an eccentric position through which the gas supply surface extends relative to the axis line.

6. The gas passage switching structure for the pneumatic rotary hand tool as claimed in claim 5, wherein the cross-sectional apertures of the forward gas closure hole and the reverse gas closure hole are respectively a fan having an arc angle $\theta 1$, the gas supply port and the discharge port are respectively a fan having an arc angle $\theta 2$, and $0<\theta 1<\theta 2 \leq \pi$.

7. The gas passage switching structure for the pneumatic rotary hand tool according to claim 6, wherein the forward gas inlet and the reverse gas inlet are respectively are respectively formed in a long arc shape along the circumferential path of the pneumatic motor, the area of the forward gas inlet is larger than the area of the cross-sectional apertures of the forward gas closure hole, and the area of the reverse gas inlet is larger than the area of the cross-sectional apertures of the reverse gas closure hole.

8. The gas passage switching structure for the pneumatic rotary hand tool as claimed in claim 7, wherein a separating wall is formed on the flow guiding disk, the separating wall separates the forward gas closure hole from the reverse gas closure hole to space apart and to form a forward gas cavity and a reverse gas cavity at one side of the flow guiding disk, the forward gas inlet is fluidly connected to the forward gas closure hole via the forward gas cavity and the reverse gas inlet is fluidly connected to the reverse gas closure hole via the reverse gas cavity.

9. The gas passage switching structure for the pneumatic rotary hand tool as claimed in claim 4, wherein the revolving valve is pressed by the elastic component so that one side of the corresponding plate surface is pressed to contact the flow guiding disk.

* * * * *